US008793317B2

(12) United States Patent
Bellomo

(10) Patent No.: US 8,793,317 B2
(45) Date of Patent: Jul. 29, 2014

(54) PROCEDURES FOR ACHIEVING ADVANCED DYNAMIC FUNCTIONALITIES IN THE CONTEXT OF SOCIAL NETWORKS AND RELATIVE NETWORK DEVICES WHICH ALLOW THE IMPLEMENTATION THEREOF

(76) Inventor: Angelo Bellomo, Licata (IT)

(*) Notice: Subject to any disclaimer, the term of this patent is extended or adjusted under 35 U.S.C. 154(b) by 303 days.

(21) Appl. No.: 13/517,881

(22) Filed: Jun. 14, 2012

(65) Prior Publication Data

US 2012/0324017 A1      Dec. 20, 2012

(30) Foreign Application Priority Data

Jun. 16, 2011    (IT) .............................. RM2011A0315

(51) Int. Cl.
 *G06F 15/16*     (2006.01)
 *G06Q 10/10*     (2012.01)
(52) U.S. Cl.
 CPC ...................................... *G06Q 10/10* (2013.01)
 USPC ............ 709/205; 709/200; 709/228; 719/706
(58) Field of Classification Search
 USPC ......... 709/204, 203, 224, 228, 200; 705/27.2; 715/706
 See application file for complete search history.

(56) References Cited

U.S. PATENT DOCUMENTS

| 8,480,471 | B2 * | 7/2013 | Lutnick et al. ................... 463/17 |
| 2006/0242581 | A1 | 10/2006 | Manion et al. |
| 2007/0238085 | A1 * | 10/2007 | Colvin et al. .................. 434/365 |
| 2008/0091692 | A1 * | 4/2008 | Keith et al. .................... 707/100 |
| 2009/0318224 | A1 * | 12/2009 | Ealey .............................. 463/31 |
| 2010/0095225 | A1 * | 4/2010 | Langlois et al. .............. 715/757 |
| 2011/0055725 | A1 | 3/2011 | Folgner et al. |

OTHER PUBLICATIONS

Italian Search Report dated Jan. 19, 2012, in the corresponding Italian Application RM2011A000315.

* cited by examiner

*Primary Examiner* — El Hadji Sall
(74) *Attorney, Agent, or Firm* — Young & Thompson

(57) ABSTRACT

A Social Network with different user types is based on: i—a plurality of terminals, each possessed by a single user, capable of opening a session with a dedicated central server (each user is associated with at least one Individual Avatar with a series of characterizing attributes and data relative to an event in the course of adhesion), ii—a first database of static type resident on the central server for registering the user in the Social Network, iii—a second dynamic database with data structuring mechanism, operative in real time, in relation to the sequence of proposed events in order to provide a Join Avatar functionality for the attainment of virtual meetings in relation to contingent events; iv—a third database resident on the central server associated with a predictive maintenance Avatar, as an engine with commercial character, including statistical processing and forecast functions.

13 Claims, 8 Drawing Sheets

PROCEDURES FOR ACHIEVING ADVANCED DYNAMIC FUNCTIONALITIES IN THE CONTEXT OF SOCIAL NETWORKS AND RELATIVE NETWORK DEVICES WHICH ALLOW THE IMPLEMENTATION THEREOF

FIELD OF THE INVENTION

The present invention generally refers to the field of digital content for the Internet, more particularly it refers to procedures for defining a series of functionalities dedicated to particular services for the user who belongs to one or more Social Networks. The object is to provide the user information for the virtual meetings on the events relative to his specific interest areas. Such meetings serve to facilitate common selections in order to ensure that the virtual contacts evolve into a real encounter capable of further development, in the context of the event in question. The invention also refers to a network system and architecture which implement and achieve such procedures.

STATE OF THE ART

Beyond the recently assumed telecommunications aspect, a virtual community or Social Network (or even social media) originally consists of any one group of people connected with each other by various social ties, which range from random acquaintance to work relationships and family bonds.

The Internet version is currently one of the most evolved forms of network communication. The network of social relations that each of us keeps each day, in a more or less random manner in the various areas of our lives, can thus be "materialized", organized in a consultable "map", and enriched with new contacts.

Known today are the services provided by various Social Networks, operating with diversified functions. The most classic example is Facebook, which allows glancing through the photographs that are loaded on the portal, or including references to pages of friends and acquaintances; it also allows leaving a message on a website for a friend or an acquaintance. Facebook is the second-most visited website in the world, preceded only by Google.

Social Networks can also be organized around working professionals, or they can be developed on a territorial basis, for example for websites dedicated exclusively to work or liberal profession. Linked-In, for example, allows storing the data relative to ones work activities (or a history of such data).

Schoolbank provides the possibility to be registered in one school, one class or for an entire scholastic year, also for the purpose of managing contacts with former schoolmates. The use of Social Networks is also spreading as an evolution of on-line radio. The websites are not limited to proposing music in mp3 format, but also interpret the tastes of users and propose similar music, presenting new artists, music and rhythm thereto. For example, last.fm and pandora.fm allow the user to be registered through his musical preferences. Such websites allow creating virtual communities by inviting one's friends to join, and also by listening to music proposed by "neighbors"—people with similar preferences to the user.

Also known are personal websites and websites such as Youtube and Flick which allow having the possibility to show one's own free time or work interests. Generally, a limiting characteristic of the current Social Networks is that they are mainly focused in building a list of contacts that is as extensive as possible, and beyond this main objective such networks are unable to offer any additional value. On the other hand, the websites do constitute a flexible instrument, since they can be maintained and new friends and acquaintances can be added; the incentive to do so is constituted by the meetings of everyday life and by the need to meet people with the same interests. In joining a Social Network, the user would have available a list of dynamic contacts based on random or programmed events—and this would be a real advantage for such user.

The principle up to now has always been to have a list of friendships/acquaintances; this is fundamentally static, and is not managed based on current needs. Although the networks today provide settings that are also programmable (e.g. the S2W, the API of Facebook or the Open Social di Google) and thus the applications to be used for the contacts on the network can be programmed, over time the attention or interest of the user progressively decreases, and after a certain period (more or less long), he participates less frequently and is less present on the portal.

A second disadvantage of the current Social Network is that while the user feels it to be a categorical imperative to take part in the virtual community, to show who he really is, none of the existing networks give the possibility to share the user's "directed" image on a particular event, interest or activity. This often leads the user to join a series of different Social Networks and belong to each specific configuration, which each of these Social Network requests. Hence, there is a substantial fragmentation of the manner in which the subject presents himself in the scope of the different Social Networks which he has joined. Even if services are provided for collecting the data from the different Social Networks into a single configuration, such as www.jaiku.com and www.plaxo.com, these are only capable of providing a summation of the Internet activities for friends and acquaintances, without actually providing a real targeted synthesis of the user profile in relation to a particular event. Essentially missing is a strategy that allows—beyond the occasional contact between different users—defining a scope of relationships on common starting points and with particular meaning in relation to the event, on which one can process and develop an effective basic data management.

The user's need to be able to operate in a virtual community in which information is provided for virtual meetings remains essential, such meetings relative to the user's specific interest areas. In addition, such meetings should facilitate common selections in order to ensure that the virtual contacts evolve into a real encounter capable of further development in the context of a given event.

SUMMARY OF THE INVENTION

Therefore, with the present invention, it is desired to provide protocols and a network architecture that serve at least one of the following objects, with consequent advantages with respect to the currently existing Social Networks:

Allowing the user to share his targeted on-line identity in a dynamic manner, in relation to a given event, with those people included as his contacts, and who were selected for such purpose.

Offering the visitor a considerable source of interests, by supplying a large quantity of different content (all the information that can be found on other portals, on only one website).

Having and maintaining the original functionalities for one's users, and at the same time providing significant additional content.

Final object of the present invention is to provide a system based on the resources of the network and on the relative procedures for achieving advanced dynamic functionalities, in the context of the Social Networks, which employ standard software and hardware components for the Internet field and communications on known TCP/IP applications, in order to ensure that the procedures themselves have reduced costs, high reliability and prompt use.

These and other objects, which will be clearer during the description, are obtained in a Social Network, with the HW means and by means of the protocols which implement the relative services, characterized by the properties outlined in the enclosed claims.

BRIEF DESCRIPTION OF THE DRAWINGS

Only for exemplifying purposes, and without wishing to limit the scope of validity of the same, the invention will be described below with reference to the enclosed drawings. In other words, the descriptions and figures relative to the following preferred embodiments, whether they are of general or detailed type, describe the functions carried out and thus are examples, and they do not reduce the value of the finding as it is characterized in the claims. In such figures:

DESCRIPTION

Key (FIG. 2)
 Individual Avatar=this is an entity formed by a single person, with his own interest profile stored.
 Join Avatar=this is an entity formed by one or more Individual Avatar, its profile is variable as a function of the event that is created; its main function is to arrange the interworking of Individual Avatars with different entities for the common attainment of a temporary event.
 predictive maintenance Avatar=mainly this is a commercial website managed by the proprietor or by its manager, but it can also be a website of a public body, such as the government of a city, which can manage it directly, or it can be managed by a commercial firm.
 Event Avatar=this is the platform in which an exchange of information occurs, in order to attain a common object among the Individual Avatars who form the Join Avatars and the predictive maintenance Avatars.
 Chat Avatar=this is the communication system which is implemented on the Event Avatar platform; it functions as a private chat room and is automatically created and activated as soon as two Join Avatars present on the same Event Avatar confirm a Join Event.

More particularly, a Join Avatar is a real or abstract event which has specific importance in relation to the event for which it is created; the data and the procedures associated therewith are strictly dependent on the type of event with which it is desired to interact. Join Avatars have a series of attributes, i.e. characterizing data, and can show specific attributed behaviors or functions in the sense that the Individual Avatar who creates it knows a series of information relative to the event and in relation to this knowledge is capable of executing and selecting a series of possible options from among those pre-established; such options are adapted to create the new profile of the Join Avatar, with which it will participate at the event that one wishes to create.

Figure 1:
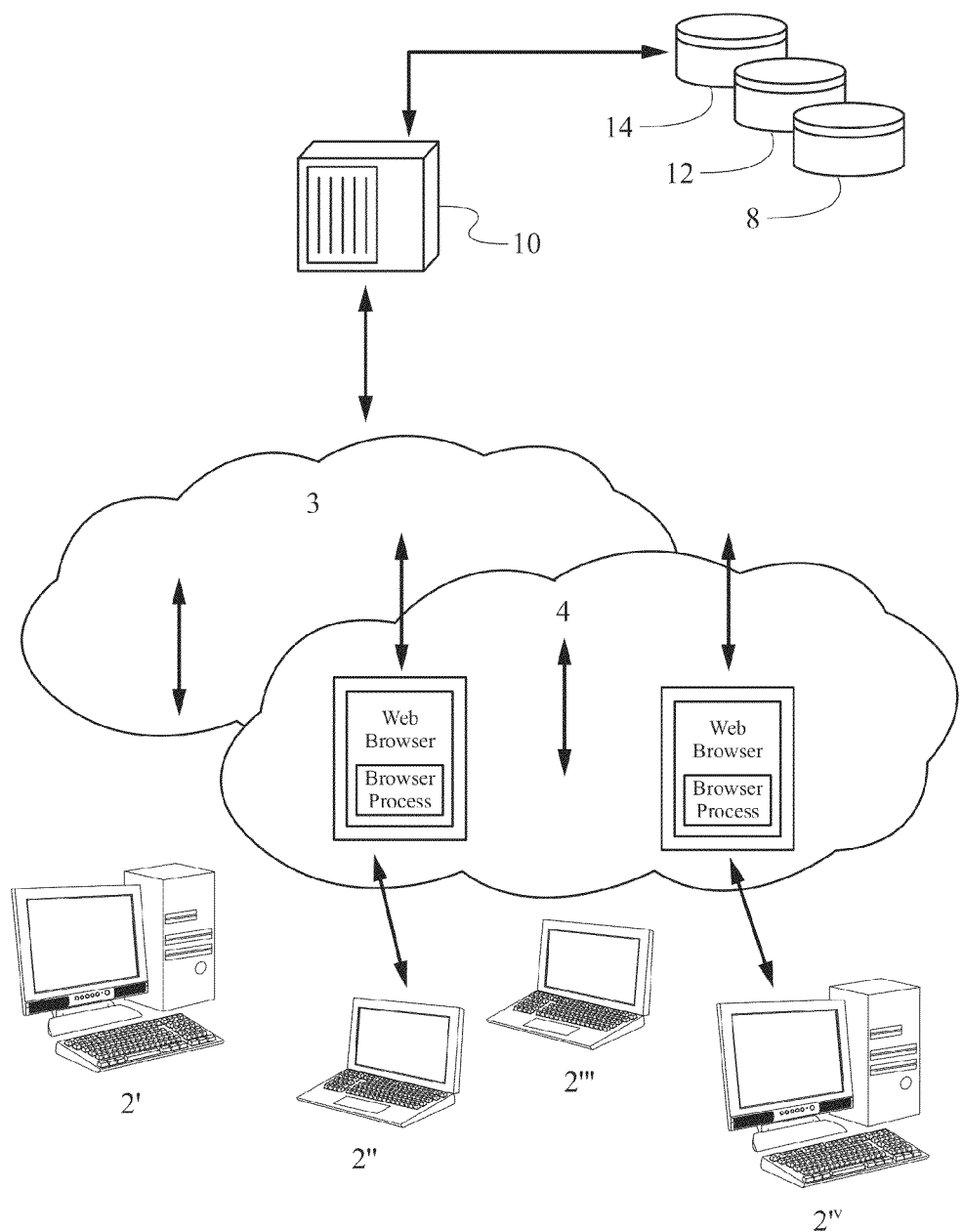
FIG. 1 is a block diagram which describes the essential entities involved in the Social Network application according to the present invention.
Figure 2:
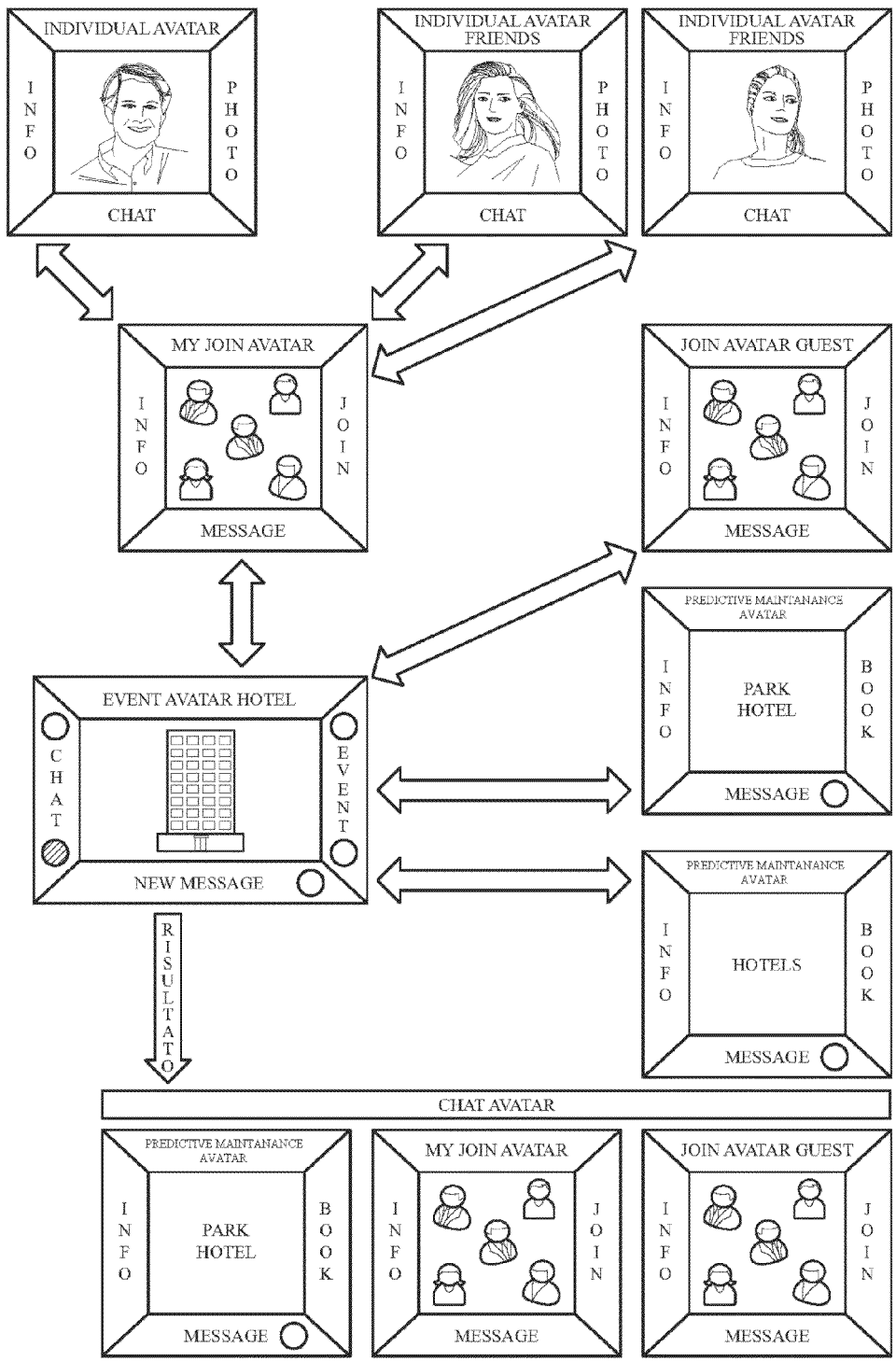
FIG. 2 is an exemplifying scheme of the various entities that are involved in the Social Network according to the present invention.
Figure 3:
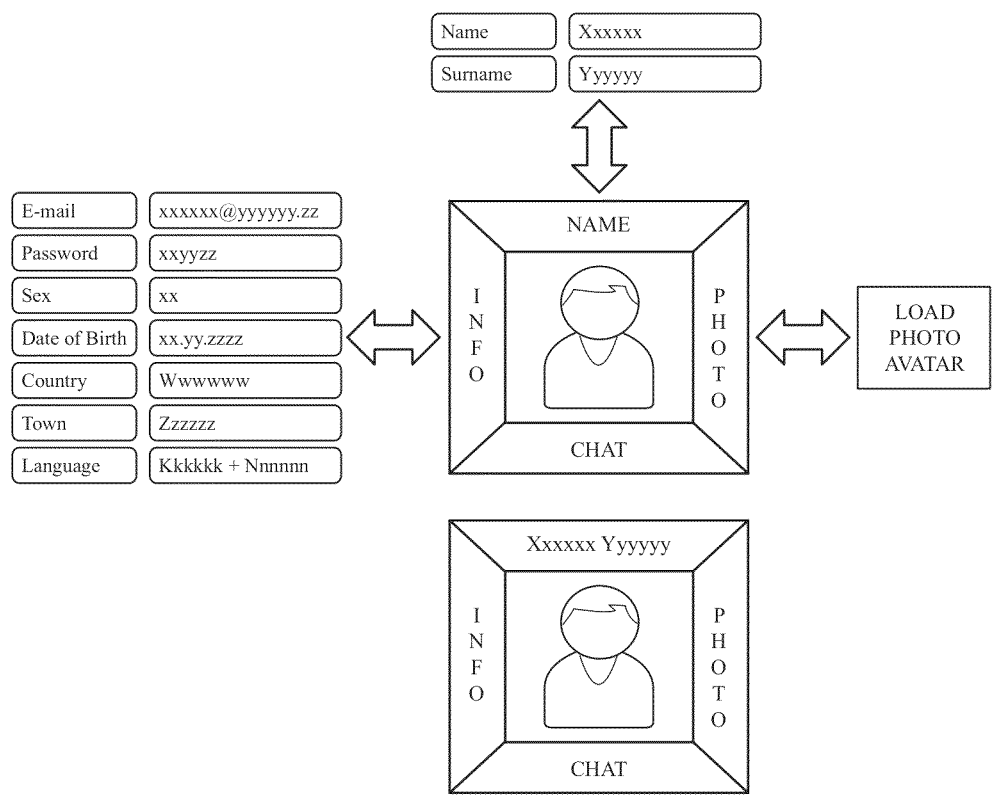
FIG. 3 is a descriptive scheme of the various entities that are involved in the registration process.

As reported in FIG. 2, with reference to that which most characterizes the present finding, different Individual Avatars have the possibility to join together and form a Join Avatar in order to plan virtual meetings in the future with other Join Avatars which are present in the same Event Avatar. These meetings serve to facilitate the common selection of the predictive maintenance Avatar to be used so that the virtual meeting is transformed into a real encounter.

The invention has its origins in the procedures already known to the computer expert for creating a virtual community. It too makes reference to a Social Network which allows:
 the creation of a public or semi-public profile inside a bound system,
 the articulation of a contact list,
 the possibility to look through the list of friends of one's contacts.

In order to join an online community, it is necessary to construct one's personal profile, starting from information such as one's email address, up to interests and passions, past work experiences and relative references, etc.

With the present invention, greater importance is given to the interests that may be shared by multiple users. It thus becomes possible to build thematic communities—Join Avatar, Event Avatar—based on interests or on participations in events, which have meaning and importance, or on business areas, aggregating other users thereto and making friendship or business contacts, since it is possible to invite one's friends to join one's Join Avatar; one's friends in turn can do the same, such that one is able to enlarge one's circle of contacts.

Starting from this common base, the invention then provides a technique for building a series of participation areas for the user belonging to a plurality of Social Networks, such to be able to generate, in a dynamic manner and on a priority basis, the contact with the user in the context of proposed events, even those proposed in an impromptu manner. In such context, a step is comprised that provides for the creation of an Individual Avatar, such as a dynamic personal profile starting from the initial acquisition of specific personal information, comprised in the scope of a data bank 8, with the profiles, interests, work, marital status, education qualification, the list of the relative friends and the elements that compose them, etc. The identifications are shared and are assigned to predetermined lists of personal participation areas, determining the relative cataloguing of each subject in the scope of the different sectors provided by the database. Following the continuous registrations of N users, the relative frequency is evaluated in real time of all the meaningful participation areas for a user community, for the purpose of obtaining a series of weighted areas with reference to the relative sectors of interest.

One or more events can then be proposed to the community of users (Individual Avatars) on the basis of an average of the frequencies in a certain sector of interest. Then the adhesion tables residing at the database 12 of the Join Avatars are manipulated by monitoring protocols in real time and processed on the server 10 in a manner so as to allow the Join Avatars to exchange information with each other regarding the determination by the users to follow one initiative or organized event—instead of another—and therefore such to automatically build and update the adhesion tables. These control procedures allow the system with the relative network architecture to be automatically adapted to possible changes. It is in fact considered that the increase or lack of adhesions, and hence an insufficiency of participants, produce variations in the database 12 which are arranged in the adaptive-probabilistic statistical process, which makes the event achievable with specific operative modes. In particular, the interest that is shown for a given event is examined, in a manner so as to provide possible alternative paths. These allow evaluating, on the basis of the interest of groups or single individuals, the feasibility of further changes by users on reserve or in any case alternative events. In this manner, the person is motivated or engaged with similar interests, possibly by means of a new Avatar Individual.

The dynamic management of the Avatar provides that the tables of the database 12 are continuously updated and modified based on the changes in the determination to follow an initiative or organized event, even if the tables themselves originally depend on the information collected by means of the procedures that detect the information on the profiles, the interests, the marital status, the education qualification, the list of relative friends and the elements that characterize each user.

The Join Avatars, through the relative databases 8, 12, exchange packets with different size, structure and information according to the type of event that is being set up. This type of Avatar management has the advantage that it can be implemented in large or very large size networks, and that it is sensitive to the detection of participant increases, or to decreases of the participants themselves, and hence to a trend that is indicating an insufficiency or a sufficiency of participations: indeed, if an event undergoes a drop in adhesions, when the Join Avatar and the relative database perceive such drop, then the predictive maintenance Avatar is permitted to reconfigure the event and the relative dynamic table by searching, for example, alternative solutions that interest the users and do not divert/direct them to external events.

If, however, the adhesion is greater than that expected, i.e. greater than that which the structure of the event can receive, so that overcrowding can be predicted for a certain event, then the adhesions can be directed onto other paths relative to events which currently have a smaller traffic volume.

The process according to which the database 12 of the Join Avatars is able to effectively and dynamically manage the progression of the interest for a certain event is based on a series of processes of probabilistic statistical type, both preliminary and from actual monitoring, in relation to the progression of the event. Provided for is the selection of one or more criteria for measuring the propensity and interest of each Individual Avatar, who belongs to a Social Network, with regard to a given event. Preliminarily—even before proposing the event—not only are the mean and frequency of the users interested in the event evaluated (on the basis of the relative profiles comprised in the member database 8), but also the dispersion with respect to the central value is calculated.

Calculating the highest frequency or an average value with regard to the sector of interest might not suffice for making decisions: one can think of a limit case in which M events all have the same frequency or average of interest by the users of the Social Network . . . according to which criterion is priority given to one event or another?

The selection of the mean and frequencies that are most reliable as index for evaluating the dispersion and probability of success is one of the fundamental objectives of the present invention. Generally, the procedure for determining a dispersion index is the following:
 a value is selected as a pole, around which the data distribution is evaluated; even if one can calculate the dispersion around any one value of the distribution, normally the pole that is selected is the arithmetic mean or the median,
 the deviations of the observations from the preselected pole are calculated,
 a suitable mean of such deviations is evaluated.

The selected means depends on the pole; in particular, considering the already known minimum properties for the mean and median:
 if the pole is the arithmetic mean, the average quadratic deviation is selected;
 if the pole is the median, the arithmetic mean of the absolute deviation values is selected.

On the basis of such initial postulates, in the present invention the typical instruments for defining the dispersion are different and are compared with each other in order to initiate the event with the greatest possibility of success; in particular the following are cooperatively used:
 the average quadratic deviation or standard deviation intended as the average quadratic deviation from the arithmetic mean;
 the average deviance intended as the arithmetic mean of the absolute deviation values from the median;
 the variance that is simply obtained as the square of the average quadratic deviation (i.e. the average of the squares of the deviations from the arithmetic mean).

From the practical standpoint, if for example a meeting in a European capital is offered to users, the average adhesion maximum is evaluated for each city and for each month of the year, based on the stated profiles of the possible Individual Avatars. Collateral information is also considered, such as the dispersion value with respect to the central value. Still as an example, evaluating a list of the most-liked capitals, the detections could be of the type:

|  | LONDON | ROME | MADRID | ATHENS | PARIS |
|---|---|---|---|---|---|
| JANUARY | 1220 | 1470 | 990 | 1010 | 1500 |
| FEBRUARY | 1270 | 1342 | 1022 | 1020 | 950 |
| MARCH | 1020 | 1498 | 762 | 1087 | 915 |
| APRIL | 1120 | 982 | 1291 | 912 | 985 |
| MAY | 1030 | 1215 | 890 | 1120 | 1057 |

-continued

|  | LONDON | ROME | MADRID | ATHENS | PARIS |
|---|---|---|---|---|---|
| JUNE | 1012 | 1465 | 390 | 1008 | 1100 |
| JULY | 1089 | 1246 | 820 | 100 | 1020 |
| AUGUST | 1511 | 1864 | 1371 | 1056 | 1167 |
| SEPTEMBER | 1097 | 1356 | 872 | 1309 | 1024 |
| OCTOBER | 1031 | 1248 | 239 | 1231 | 978 |
| NOVEMBER | 1256 | 1698 | 1090 | 897 | 964 |
| DECEMBER | 1114 | 1500 | 320 | 1023 | 250 |

The field of variability of the data for Paris is 250-1500; if the evaluation was only based on this value, one would have to state that in the Individual Avatar group that prefers Paris, there is high data variability; in reality, though, it is observed that much is concentrated over a narrower range comprised between 950 and 1200.

Therefore, the preliminary use of the aforesaid parameters of statistical type allows valuating, in a synthetic, mathematical manner, the degree of intensity with which event adhesion will occur. Success can be verified by the rapidity of the confirmations in relation to the total number of initial contacts, who were subjected to preliminary study, with regard to the actual specific participation for that given event.

In substance, the data structuring mechanism in the relative databases 8, 12 allows assuming virtual trends for a plurality of events based on simulated contacts, providing therewith an adaptive statistical progression relative to the virtual trends pertaining to the plurality of contacts. In such a manner, a series of profiles are created on how many are presumably interested and show a propensity to participate in a specific event based on the number of initial people to whom the event was communicated, and on the frequency with which the people adhering to the Social Network would respond to the event participation request. At the same time, alternative solutions are preconfigured, i.e. the average quadratic deviation, and/or the average deviance and/or variance, in order to construct a resource of variations and alternatives with respect to the initial event. These detections are carried out in a dynamic manner, and not just before proposing the events to the users.

It should be stated that the selections regarding which event to support, or the proposal of additional stimulating initiatives, or whether to entirely give up on an event, are based on an activity of continuous detection of the statistical parameters.

For the purpose of executing such processes, each Join Avatar 12 will construct its own table relative to the event, starting from which it can calculate the parameter that indicates the "expected percentage of success", by employing an algorithm that optimizes the evaluation.

This table type is also stored on the server 10 with the database 12 constituting a resource for comparison on the actual adhesion progression in relation to the initial predictions. Indeed, with regard to the Individual Avatars, an essential characteristic to be considered is that similar entities can be classified with only one definition, since they are characterized by the same attributes, by the same potentialities and functionalities for which they were created. In other words, the specific definition of each Avatar is of general type for a class of events for which the Avatar was derived and implemented. The Individual Avatars interact and work with each other and relate to the greater event constituted by the Join Avatar relative to the event. This signifies that an Individual Avatar can execute functions that are substantially the same as a similar Individual Avatar. All this is transparent to the user, who in practice sees his own Avatar as a black box which offers a series of functionalities in relation to the event and to the Join Avatar with which it is interconnected and interworks.

From this standpoint, the principle of heredity is fundamental. Objects of Individual Avatar and Join Avatar type which exist in a certain context, in relation to a given event, can be reused or included in another system that corresponds to a different event. The activity of reuse occurs when the proprietor of one Avatar is found to be transported on another Individual Avatar which derives its characteristics from another event. A further Join Avatar is defined on such transposition. In this sense, it is specified that the particular Avatar object comes to extend its own distinctive characteristics from its current object and can interact and have correlations with other "innumerable" different Individual Avatar objects that are similar but not equivalent thereto.

The essential principle of the present invention lies in the implementation of a technique which derives new definitions of Individual Avatars and Join Avatars, in relation to an event, starting from the profiles defined in the past on previous events. This new information is translated, since this is a redefinition that does not entirely overturn the initial profile and instead allows the reuse of functionalities that have by now been specifically tested, of behaviors of the specific Avatars in the context of a series of different events, etc. Such flexibility allows producing an examination of adaptive, probabilistic and statistical type with the possibility of easily using the Individual Avatars belonging to one class of events for another class of events, by taking the same functions of statistical type, of selection type, for overall evaluation of the progression and the interest, e.g. with regard to a particular event. When this hereditary management technique is used for passing from one event to another with the construction of derived Individual Avatars and the like, the characteristics relative to the Join Avatar of the original event can be reused or varied as desired, new fields can be provided for and new functions can be added to those preceding, just as one or more functions can be eliminated.

The abovementioned main principle of the invention can be applied in numerous sectors; a certainly not exhaustive list of these is reported below, with the relative most important characteristics.

Join in Town Benefits

1) Make friends in advance with people who live in the city to be visited and who have your same origins (for example, Italian).
2) Make friends in advance in order to share the events that will take place in the country to be visited.
3) Make friends in advance with people who visit the same city in the same period.
4) Make friends in advance with people who wish to learn or improve your language.
5) One can make a virtual reservation in multiple cities (same period) and afterwards decide in which the city to confirm the reservation, as a function of the events and services offered by the government of the city in question, and decide on the most important thing based on the friendships that one has been able to make.
6) Constitute a search tool for searching for relatives or acquaintances in the city of origin.
7) The predictive maintenance Avatar Town in this case is the official website of the government of the city to be visited, from which a great amount of cultural and economical information can be accessed. Starting from the deals that each predictive maintenance Avatar Town makes with agencies (Travel, Real Estate, Funeral, Bar-Restaurant Establishments etc.) and with all that that revolves around the services and uses of the website ILLJOINYOU.

Join in Hotel Benefits

1) Make friends in advance with people who will lodge in the same hotel, in order to share: dinner, visit well-known sites, participate at events, go to bars, events, etc.
2) One can make a virtual reservation in multiple hotels (same period and place) and decide afterward at which hotel to confirm the reservation as a function of the friendships that one has been able to make.
3) Select the hotel on the basis of the people who are staying there (old, young, or other selection criteria) and not only as occurs today by means of photographs of the hotel or through opinions given by those who have already stayed there.
4) Constitute a reservations tool which gives new advantages to the hotel owner for better managing his own activity, as he can:
A) See who has reserved, and he can send to such people information in advance on events that will take place during their stay, or special services etc.
B) See who has made the virtual reservation and send promotional or informative messages in order to convince them to confirm.
C) This predictive maintenance Avatar is managed by the hotel owner, by adding several applications of the Illjoinyou system which facilitates the meetings at the owner's existing site.

These modifications can also be inserted in all the pre-existing on-line reservations websites so that they can insert the Individual Avatar in the Guest list of the hotel. The data that is normally inserted on-line in order to carry out the reservation is sufficient for creating a temporary Individual Avatar linked only to that reservation, when the person reserving is not registered. However, if the person making the reservation is registered in the service, he will be automatically inserted by following the (Invited) procedure, then the client can make the proper non-obligatory activations (Chat, Photo, Message).

5) Given that one can see every single client photograph and information, the hotel owner will know if the client is invalid, if he is elderly etc., and thus it will be possible to accommodate clients in the rooms in the best possible manner; for example, if they are elderly clients, they should be placed in the most easily reachable rooms, perhaps those closest to the elevators.

Join in Cruise Benefits

1) Make friends in advance with people who reserved on the same ship.
2) One can make a virtual reservation in several cruises, and then decide in which to confirm the reservation as a function of the friendships that one has been able to make.
3) Select the cruise based on the people staying there (old, young, or other selection criteria) and not only as occurs today by means of photographs or through opinions given by those who have already been on that cruise.
4) Constitute a reservations tool that gives new advantages to the Ship-owner for better managing his own activity, as he can:
A) See who has reserved, and he can send to such people information in advance on events that will take place during their stay, or special services etc.
B) See who has made the virtual reservation and send promotional or informative messages in order to convince them to confirm.
C) This predictive maintenance Avatar is managed by the Ship-owner or Agency by adding several applications of the adhesion system to his existing website.

These modifications can also be inserted in all the already-existing on-line reservations websites, so that they can insert the Individual Avatar in the ship's Guest list. The data that is normally inserted on-line for making the reservation is sufficient to create a temporary Individual Avatar linked only to that reservation; this occurs when the reserving party is not registered. However, if the person making the reservation is registered in the service, he will be automatically inserted by following the (Invited) procedure (which will be discussed below), then the client can make the proper non-obligatory activations (Chat, Photo, Message).

5) Given that one can see every single client photograph and information, the operator will know if the client is invalid, if he is elderly etc., and thus it will be possible to best accommodate clients in the cabins; for example, if they are elderly clients, they can be lodged in the most easily accessible cabins, and perhaps close to the elevators.
6) Select in advance the person with whom one will share the cabin and the expenses.

Join in Train/Bus Benefits Similar to Join in Cruise

Join in Car+Bike Benefits

1) Search for people in advance who will be travel companions on a car trip.
2) Select the people in advance with whom one will share the car or the trip expenses.
3) Select if using one's own car or that of the contact based on the country of origin.
4) Reduce fuel consumptions and thus atmospheric emission of $CO_2$ due to the fact that one is sharing the car with people who in turn would have used another car to reach the same location.

Join at Party Benefits

1) One can organize a party with people who do not know each other, and give them the possibility to meet each other virtually before the event takes place.
2) One can organize a party for a certain type of Individual Avatar, such as: only women, only men, only couples, only singles, only gays etc.
3) Make friends in advance and perhaps convince people in the meantime who did not intend on participating.
4) The Join Event Party can be organized by an Individual Avatar or by a predictive maintenance Avatar, such as: private party, company party, evenings organized by places such as bars, discotheques, concerts etc.
5) When the party with entrance fee is organized by a predictive maintenance Avatar, one can purchase the ticket with the procedure of the system.

Join Job Benefits

1) One can be virtually present in any city of the world and be immediately placed in contact with all the predictive maintenance Avatars of that city who are offering work compatible with one's capacities and requests.
2) With the Illjoinyou system, one can facilitate the search of several characteristics which supply and demand may require, such as: native language, territorial origin etc.
3) With the Join Avatar system, one can search for work not only at the individual level, but also for a couple, for a group of friends, for a family-type job etc.

Reference will be made below to some of these applications, in order to show their high interactivity.

A series of specific procedures were programmed pertaining to the Individual Avatar object. The main procedures are considered herein, only as an example. In particular, in the function of management of the Individual Avatar, the following are distinguished:

a—"My Individual Avatar in registration position"
b—"My Individual Avatar in Home position":
c—"My Individual Avatar in Join position"
d—"My Individual Avatar seen by the Individual Avatar Guests".

As reported in FIG. 2 and subsequent figures, a series of icons is provided on the edge of the photograph, such as info, name, chat, . . . . The frame thus comes to assume the same function as a multiple choice menu. For example, for the object "My Individual Avatar" during the registration step, the insertions of the normal data are provided, such as Name, Info (all the boxes are compiled, the city and the country are automatically inserted by the click actuated on the map during the registration; in this step, also the GPS data etc. is loaded) and Photo (one must insert one's own photograph to be used by My Individual Avatar; one can load from the image file or from another source).

The frame in the registration step remains at the default color, given that the connection can only be carried out when My Individual Avatar is positioned in one's Home Account.

Figure 4:
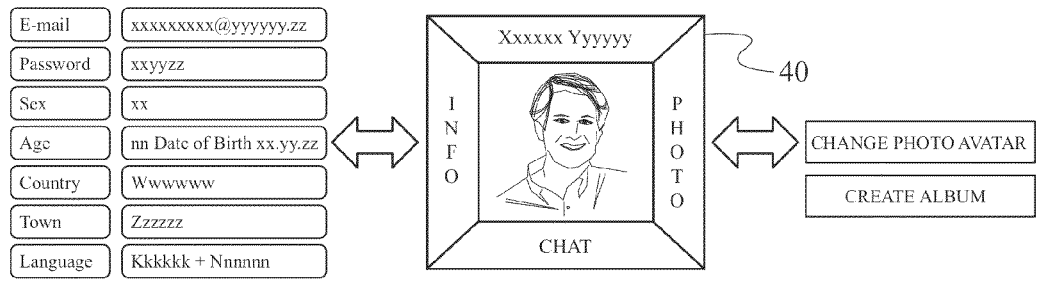
FIG. 4 is a descriptive scheme of the functionalities comprised in a particular step of the service supply.

However, the fundamental condition for reconfiguration of the service is related to the My Individual Avatar function in Home position, FIG. 4. By clicking on the Info icon, all the info is displayed that was inserted. From this position, one can only change E-mail, Password and Language. If one intends to change some information, after having clicked on Info, one clicks on the photograph and the information to be changed will begin to flash, and to confirm one clicks once again on the photograph. In order to change the other data, one must redo the registration.

By clicking on the Photo icon, one has the possibility to change the photograph at My Individual Avatar and insert photographs in the proprietary albums. As occurs in all Social Networks, the albums are only visible to the friends present in the address book. In all the Join steps, the albums are not active, but one can create a specific album each time that a Join Avatar is created. It is therefore clear that the present finding maintains the original functionalities for its users, providing significant additional content at the same time.

By activating the Chat function, to which a variation of the border 40 corresponds, one can intervene on this activation/deactivation depending on the position of My Individual Avatar. Chat is only clickable for activating or deactivating the connection of the Chat to the network.

With regard to the functions indicated by the border, when the Chat is active (indicated by the color of the frame), upon clicking the Chat is connected to the network and the frame 40 changes color; hence in this step the color of the frame indicates whether the Chat is online or not. When the Chat is activated on the network, the Chat is automatically activated of all the Event Avatars along with the reception of the recorded messages.

The icon relative to the Image in this context has the function of activating and giving consensus to the change of personal data.

Figure 5:
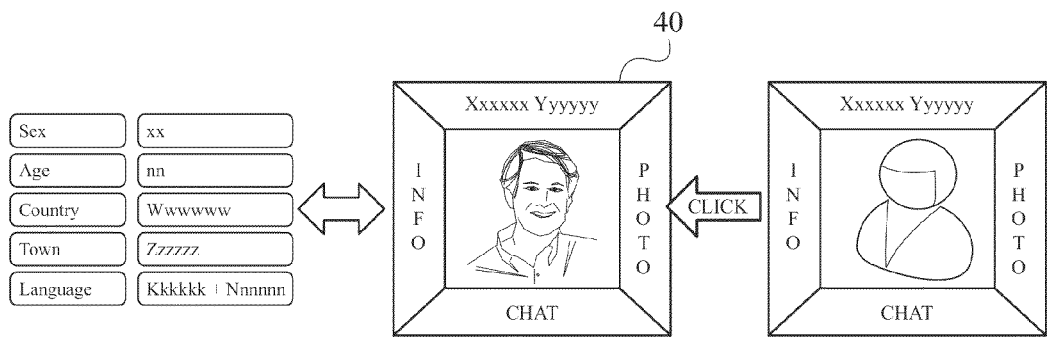
FIG. 5 is a descriptive scheme of the functionalities comprised in a particular step of the Join service supply.

The actual access to the service in relation to the given contingent event occurs, with reference to FIG. 5, by activating the My Individual Avatar procedure in Join position.

If one activates the Info item, all the information is displayed which sees all the connected Individual Avatar Guests.

If, instead, one clicks on Photo, My Individual Avatar is automatically loaded with the writing 'Photo' with color corresponding to the activation, hence with personal photograph visible to all; if one clicks on Photo, it changes color and in place of the personal photograph, there appears the image of the Avatar.

My Individual Avatar is automatically loaded with the writing 'Chat' with non-modifiable color (green); this allows receiving messages from other Individual Avatar Guest and allows creating and activating the Chat Avatar.

In the scope of this solution, the Frame 40 has a fundamental role: with its specific color, it will have the same color of the My Individual Avatar Home, hence if My Individual Avatar Home will have Chat connected to the network, also My Join Avatar will be connected to the network during the Join steps.

It is also useful to consider a series of operative conditions relative to the function "My Individual Avatar seen by the Individual Avatar Guests" which in part make reference to the typical sliding functions of the contact list, and in part are characterized for the particular application in question.

Figure 6:
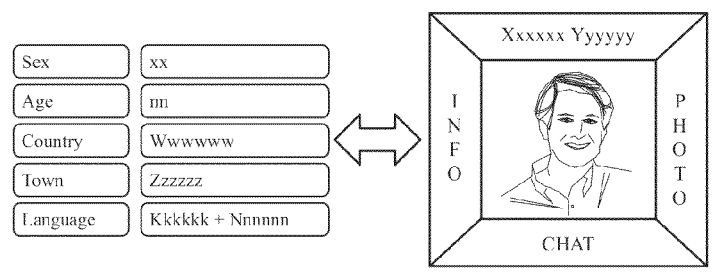
FIG. 6 is a descriptive scheme of a further functionality comprised in a particular step of the service supply.

By activating the Info icon in FIG. 6, the personal information is displayed, visible to all the Individual Avatar Guests. If instead one activates Photo, if there are albums loaded, these are automatically opened, otherwise a writing of No Album type is displayed.

If the Chat is marked by an operative color (e.g. green), this signifies that the Chat is active and hence the user can receive messages: recorded if he is not connected to the network or live if he is.

In practice, when the frame has red color, the user can only receive recorded messages, since he is not connected to the network, whereas if the frame is green, he can receive live messages.

Figure 7A:
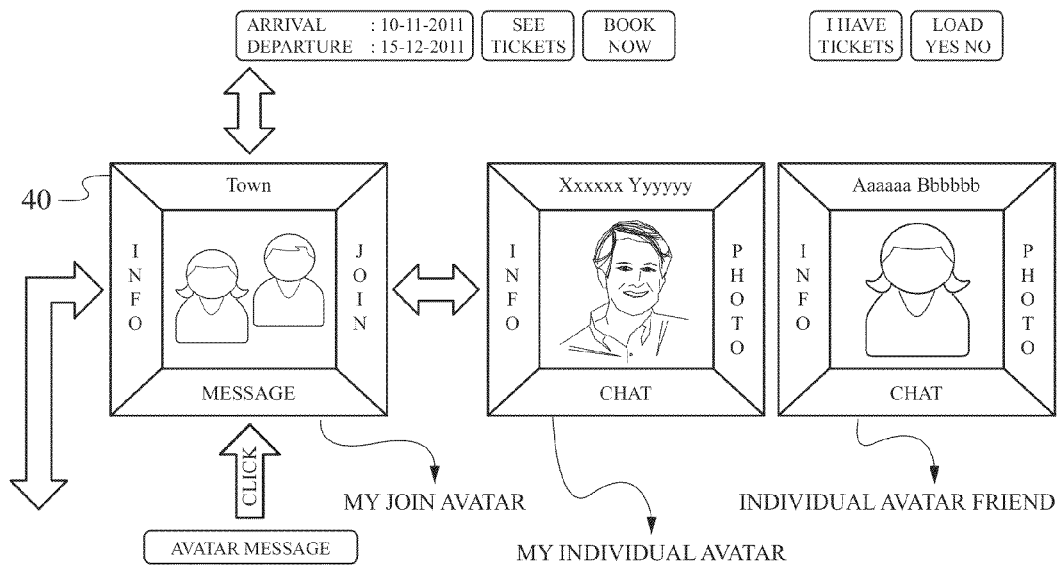
FIGS. 7a and 7b are descriptive schemes of the functionalities comprised in a particular step of the service supply according to the present invention for a particular application.

It is interesting to underline, still as an embodiment example, a specific application such as Join, i.e. the function which provides for the event of a meeting between Individual Avatars who met online in My Join Avatar in Join in Town, during creation step (FIG. 7a).

It must be considered that all the data inserted on My Join Avatar for participating in a Join Event serves to create its identity and for filtering and searching for elements in common with the Join Avatar Guests.

With reference to FIG. 7a in the specific Join functionality, the Individual Avatars are inserted which will form the Join Avatar. When the Join step is initiated, and the My Join Avatar is selected, My Join Avatar is displayed with the writing Join that flashes and the Individual Avatar automatically loaded ready to be instructed. The Individual Avatar Friends who wish to be involved must be manually loaded from one's own address book.

When an Individual Avatar Friend is involved in a Join Avatar in order to participate at an event, the Invited procedure is started, which will allow it to know all the details regarding the Event. Until the reception of the Chat Avatar, he cannot in this case organize any Join Event, since only the user who created the event can do so, but he can participate in the Chat Avatar without limitation and he will be able to personally manage and change the data loaded by the user during the creation on his Individual Avatar. An Invited Individual Avatar Friend is recognizable in the Chat Avatar by the color of his first and last name, which will be red, while the first and last name of the event organizer will be green; in this manner, everyone will know who organized the event.

Figure 7B:
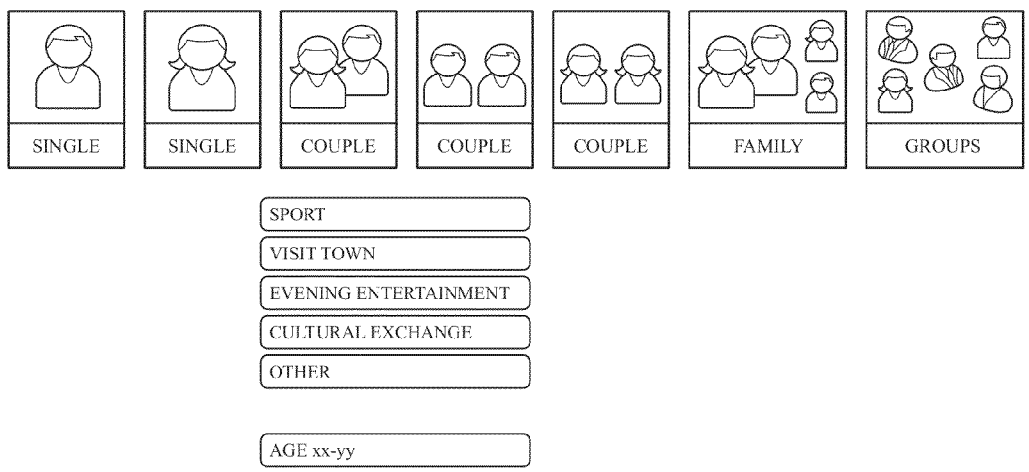

With regard to the Info functionality, when this begins to flash the step of insertion automatically begins of all the information which will serve to facilitate the Join Avatar search. As is reported in FIG. 7b, one must in sequence:

1) Select the type of Join Avatar Guest that one wishes to meet, with a minimum and maximum number of participants.
2) Select the event with which one wishes to meet the Join Avatar Guest, from a minimum of 1 to a maximum of all that reported on the list.
3) Select the age of the Avatar that one wishes to meet, and to proceed one clicks on the image of the My Join Avatar, FIG. 7a.

A further functional selection in the icon menu of FIG. 7a is Message. When Message starts to flash, one must insert the message to show to the Join Avatar Guests. Unlike the other information which is obligatory, the insertion of the message can be omitted; in this case, one clicks directly on the image of the Avatar in order to proceed and the writing 'Message' remains red color.

The Dates/Town area of FIG. 7a is always dedicated to the trip confirmation, but is managed in a different manner based on the type of Join Event that one is organizing. In the case of Join in Town, a step for inserting the dates is initially provided, and then the name of the town to be visited is automatically inserted after having clicked it on the map. After having confirmed the city that one intends to visit with the click on the map, there is the first contact with the predictive maintenance Avatar, which will be a travel agency that has an agreement with the Social Network; the agency will ask the user if he wishes to reserve the trip by purchasing the tickets now or later. If the user decides to purchase the tickets immediately, the purchase procedure is started, and after having successfully and automatically concluded such procedure, the frame 40 of My Join Avatar becomes green, confirming the visit of the user in that city. If the frame 40 assumes the red default color for the activation, if one clicks on Town the following are displayed:
1) the trip dates
2) the See Tickets button; if one clicks on the button, it is possible to view and print one's tickets or previously made reservations.

If instead there is no reservation, in place of the See Tickets button, two other buttons will appear:
1) Book Now; if one clicks this, the entire procedure for making the reservation with the agencies collaborating with the Social Network will be automatically started, and if the reservation is successfully concluded, the frame 40 of My Join Avatar changes from red to green, to indicate the confirmation of the presence of the My Join Avatar at the Join Event.
2) I Have Tickets; if one clicks this, one automatically confirms the presence of the My Join Avatar at the Join Event in question and hence the frame consequently changes color; there is the possibility to load, with a file (Word, PDF, etc.), the (reservation) tickets issued by other agencies that do not collaborate with this Social Network, and also in this case once the tickets are loaded, these will be consultable by clicking on See Tickets.

Figure 8:
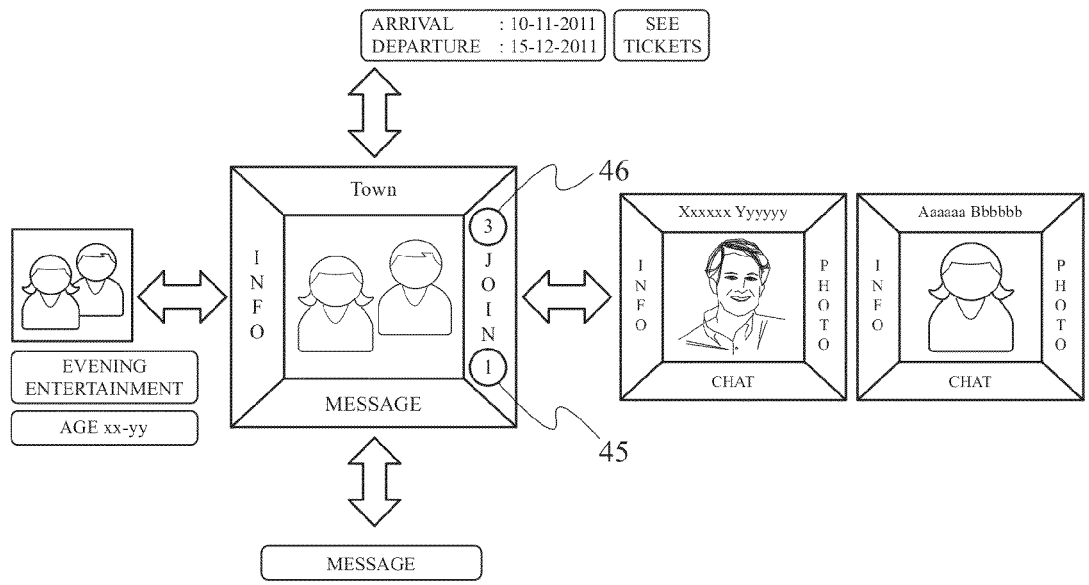
FIG. 8 is a further scheme relative to the completion of the service already introduced with FIGS. 7a and 7b.

With regard to the actual service of My Join Avatar in Join in Town Active in FIG. 8, if one activates the Join icon, all the Individual Avatars are displayed which form the Join Avatar; when the Individual Avatars are displayed, one can directly access their information by clicking on the relative buttons.

The number inside the green circle 45 indicates the number of Join Avatar Guest confirmed.

The number inside the red circle 46 indicates the number of Join Avatar Guests to be confirmed.

These circles, when flashing, indicate that there have been non-viewed updates.

If one clicks instead on the Info icon, the information is displayed that was previously inserted for facilitating the Join Avatar Guest search.

In this step, in addition to that already stated above, a new function is added: if the writing Town changes into an alarm color (e.g. it becomes red), it means that something pertaining to the tickets, to the reservations etc. was canceled.

As a verification of the interactivity of the entire system, also the frame color indicates if in that specific Join Event, the My Join Avatar has confirmed its presence or not.

The function of the Imagine icon in this context is directed to the Join in Town event.

If one clicks on the image of the Join Avatar, one is transferred to the government website of the city where the event is being organized.

Figure 9:
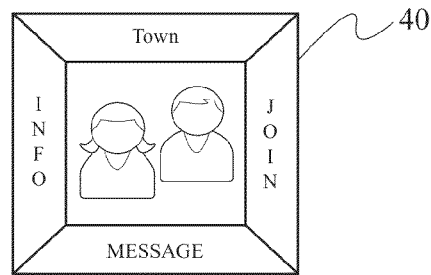
FIG. 9 is a representation of an icon that provides particular functions that can be selected by a user, relative to the completion of the service already introduced with FIGS. 7a and 7b.

The procedure for creating the My Join Avatar Guest in a Join Guest step, as shown in FIG. 9, referred to the area (Join, Info, Message) is identical to that of the My Join Avatar, whereas the area intended to confirm the Dates/Trip is automatically managed with the insertion of the name of the city of the resident. In addition, the dates vary based on the fact that one is in the step of (Help To Join Guest or Join Guest).

The color of the frame 40 of a My Join Avatar Guest (of the host) is always black, since the resident does not have to confirm any trip.

In this procedure, if one clicks on Join, all the Individual Avatars will be displayed which form the My Join Avatar Guest; when the Individual Avatars are displayed, one can directly access their information by clicking the relative buttons.

Similarly, if one clicks Info, information will be displayed that is inserted for facilitating the Join Avatar Guest search.

Figure 10:
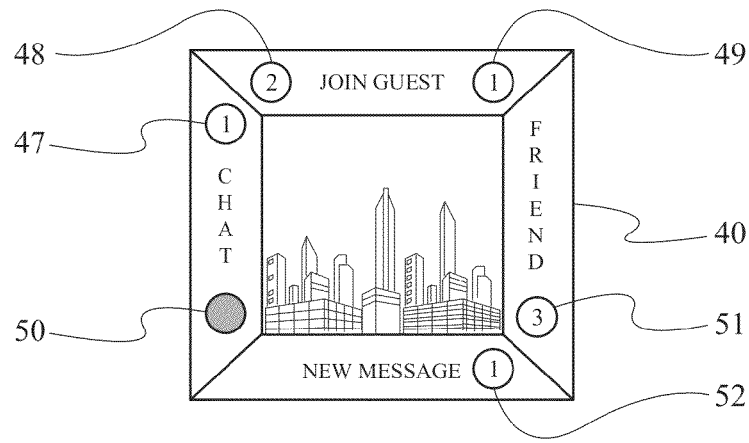
FIG. 10 is a representation of an icon that provides particular functionalities relative to the completion of the service, in the scope of a specific management of the event by the different entities.

It is interesting to have a view of the implementation, also from the standpoint of the actual event. For such purpose, it is useful to consider the Join Guest Event functionality, whose icon is reported in FIG. 10, by examining its definitions menu.

If one clicks on Friends, one opens the address book of the Individual Avatar Friends. If Friends is red, this means that there are no friends online; if it is green, it means that there are friends online. The number inside the green circle 51 indicates the number of messages still to be read, which the Individual Avatar Friends have sent. If one clicks on the number inside the green circle 52, the confirmed Chat Avatar Guests will be displayed as well as those to be confirmed who have sent the message; the new message will not be visible until one clicks on the (date and time), which will flash, such that one can confirm the reading of the message. The latter procedure is applied in all the Chat steps, even when one is connected with a person in direct/live Chat mode.

If one clicks on the image, which in this case will depict one's city of residence, one will open the page with the two buttons (Join Guest, Help To Join Guest) that will serve to organize a Join Guest Event.

The number inside the red circle 49 indicates the number of Join Avatar Guests to which the Join request was made who have not yet confirmed; if one clicks on the number, all the Join Avatar Guests who were sent a Join request appear. The number inside the green circle 48 indicates the number of Join Avatar Guests who accepted the Join request. If one clicks on the number, all the Join Avatar Guests appear who one must meet.

The Chat service carries out a particular function in this context:

When the dot 50 is, for example, red, this means that that Event Avatar has deactivated Chat, hence even if My Individual Avatar Home has the Chat activated online, the user will be the one to decide which Event Avatar he wishes to connect to the network; in this state, none of the Join Avatar Guests (confirmed or to be confirmed) involved in the Event Avatar will see the user connected to the network, and they can only send recorded messages that he will receive. If one clicks on the red button 50, it will become green, and vice versa.

When the dot is green, this indicates that that Event Avatar has the activated Chat connected to the network.

The number inside the green circle 47 indicates, if the Event Avatar is connected to the network, the number of all the confirmed Join Avatars who have the Chat activated online.

Figure 11:
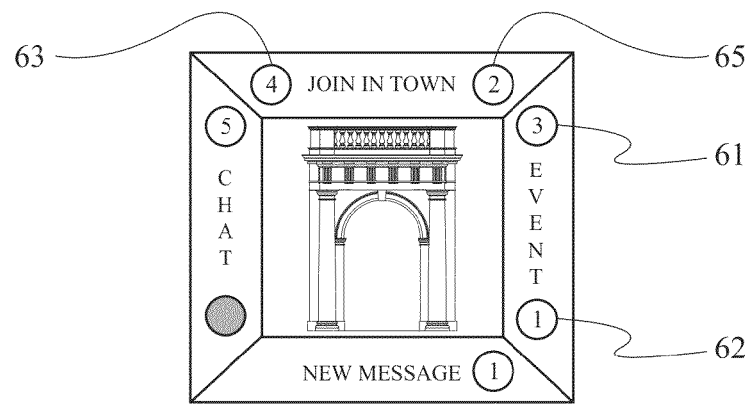
FIG. 11 is a representation of an icon which provides particular functionalities relative to the completion of the service, in the scope of a further specific management of the event by different entities.

If one clicks the number inside the green circle 47, the confirmed Chat Avatar Guests will be displayed who in this instant have their Chat activated and online. Still from the standpoint of the event, one important functionality that has been developed is exemplified by the Avatar Town Event, whose icon is reported in FIG. 11.

If one clicks on the image, one will automatically activate the procedure for organizing a Join Event Town.

If one clicks on Event, all the Join Event Towns (confirmed and to be confirmed) which were organized are displayed.

The number inside the red circle 61 indicates the number of Join Event Towns organized, but which have not yet been confirmed since one must still purchase the travel tickets; if one clicks on the number inside the red circle 61, the latter will be displayed.

The number inside the green circle 62 indicates the number of Join Event Towns confirmed with the purchase of travel tickets; if one clicks the number inside the green circle 62, the latter will be displayed.

With the Join In Town functionality, the number inside the red circle 65 indicates the number of incoming Join requests made by the Join Avatar Guests (residents and visitors of the country to be visited) to which confirmation has yet to be given, in addition to the outgoing Join requests made to the Join Avatar Guest (residents and visitors of the country to be visited), which must still be confirmed by the same. If one clicks on the number inside the red circle 65, the latter are displayed.

Figure 12:
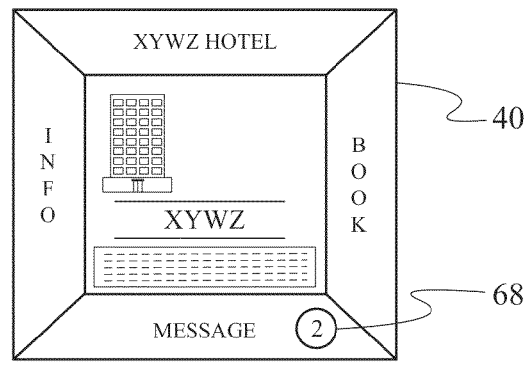
FIG. 12 is a representation of an icon which provides particular functionalities relative to the completion of the service by a manager of a commercial activity.

The number inside the green circle 63 indicates the number of Join Avatar Guests (residents and visitors) of the country to be visited who have been confirmed. If one clicks on the number inside the green circle 63, the latter will be displayed. At this concluding point of the description of the implementation details, it is useful to have an at least general vision of the predictive maintenance Avatar function (FIG. 12). It is directly managed by the proprietor or by the manager of a commercial or non-commercial activity (Hotel, Municipality, Agency, Bar-Restaurant Establishments, etc.). The latter interacts with the Individual Avatar Guests who organized a Join Event by using his own structure. The predictive maintenance Avatar can only be found in the Chat Avatar setting. It is preferred that a predictive maintenance Avatar is recognizable by several distinctive specific signs, for example the color of the frame 40 and the image type. If one clicks on Book, the reservation procedure is started in order to confirm. If one clicks on Info, all the commercial information of the predictive maintenance Avatar will be displayed.

When one clicks the number inside the circle 68, the Chat Avatars are displayed of the pertaining Join Event.

And if one clicks on Hotel, one is connected to the website of the same hotel. On the Illjoinyou website, there is a session dedicated to the predictive maintenance Avatars, where they can make their own promotions (directed and not as a function of user needs) entirely unconnected with the Events organized by the user, for the sole purpose of stimulating the user to organize new Events using their predictive maintenance Avatar.

Figure 13:
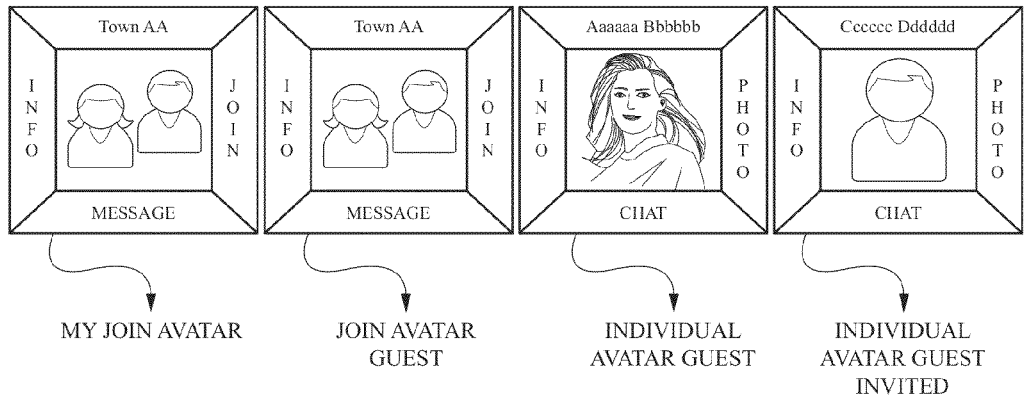
FIG. 13 is a further schematic diagram which makes reference to another preferred embodiment of the services according to the invention.
Figure 13:
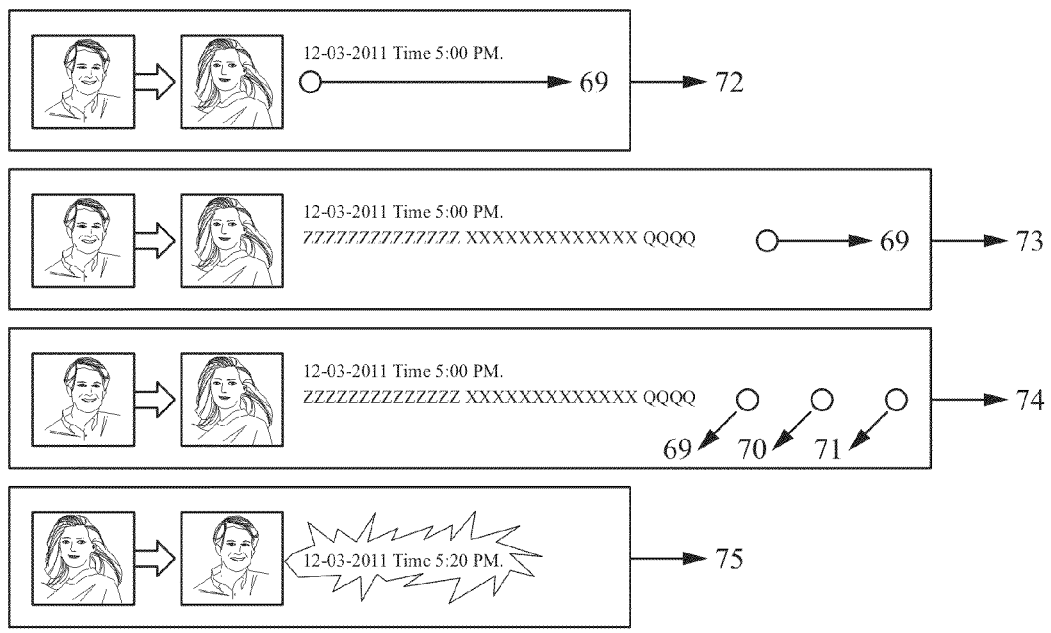

Particular attention is to be given to the Chat Avatar. The purpose of the Chat Avatar function is to ensure the active entities a logical resource for organizing the meeting between the different Avatars. The Chat Avatar assumes that the basic instruments have already been implemented, such as the single Individual Avatars and the Join Avatars relative to the event. The meeting between the different entities is structured in activities, in turn composed of one or more executive steps relative to the event. Depicted in FIG. 13 is a Chat Avatar active in a Join In Town Event. This represents the embryonic stage of the system, where the generated virtual event starts its process of transformation towards a real event; this occurs through the exchange of information which is generated between the entities involved in the event in question. All the Avatars involved in the event have the same Chat Avatar in common, loaded with the entire chronology of the messages since its creation. In substance, it acts as an on-board diary, since all the Avatars involved can see who messages with whom and what they say. When the user activates the Chat Avatar, his Join Avatar is placed first, and then the Join Avatar Guest is placed. The user is only preceded by the predictive maintenance Avatar when he sends a message to the Chat Avatar. The procedure of sending and receiving the messages is listed below:

A) Send message to an Individual Avatar Guest, one clicks on the join button of the Join Avatar Guest in a manner so as to display all the Individual Avatar Guests involved in the Join Event; then, one clicks on the Chat button of the Individual Avatar Guest to whom it is desired to send a message, and automatically the writing line 72 of the Chat Avatar will appear, composed of:

1) Photograph of the user followed by the Guest photograph;
2) Date and time of the message;
3) Flashing black cursor followed by a green dot 69.

After having written the black color message 73, one clicks on the green dot 69 to send it; after sending, the message will become red 74, and will then become green when the other party reads the message. This color system will facilitate the recognition of the outgoing and incoming messages; indeed, the incoming messages are always black, while the outgoing messages will always be red if they must still be read by the receiver, and green if they have been read. At the end of each sent message, three dots will be present: green 69, orange 70 and red 71. When the green dot 69 is activated, this means that the message of the user will be visible to all those involved in the event; this setting occurs automatically. When the orange dot 70 is activated, the message sent by the user will become invisible to all except the user who generated it; this procedure is reversible by activating the green dot 69.

When the red dot 71 is activated, the sent message will be definitively eliminated from the Chat Avatar without the possibility for recovery.

B) Reception of a message from an Individual Avatar Guest; when the user receives a message, the writing line will appear of the Chat Avatar 75, composed of a series of information such as:

1) Photograph of the Guest followed by the user photograph;
2) The date and time of the flashing sent message.

In order to display the message that will appear black in color, it is necessary to click on the flashing date/time.

The Chat Avatar can:
1) Be deactivated by the predictive maintenance Avatar when he recognizes that that given event cannot be carried out in his structure or place.
2) After the conclusion of the event, be individually eliminated by the subjects involved in the event or it can be saved in a folder present on one's home account, as already underlined, given that all the information relative to that event (participants, tickets, messages etc.) is present in the Chat Avatar.

Advantages and Industrial Uses of the Finding

A characteristic advantage of the present invention derives from overcoming the limiting data model which provided that the operations of dynamic type (update) of a database make the latter pass from one instance to another, maintaining the data structure and the integrity constraints in their initial configuration.

Based on the present finding, an operation which involves an updating of the stored information content can lead to the formation of a new database, with a new scheme, with different instances of the data and operations for handling the data itself. This can occur, for example, in the most obvious case, when the adhesions to an event are reduced to a level so low as to eliminate its relative management database.

From another standpoint, for the man skilled in the art, it is clear that the various structures composing the network architecture can be implemented based on hardware, software or related quite different combinations. Preferably, these elements are made with a combination of hardware and software resources that are typical of the Internet, and one or more basic programmed devices at the user level with general purpose applications, operating on devices which comprise a processor, memory and input/output interfaces etc.

Therefore, when the term "interworking" was used, it indicated the components that can be directly or indirectly connected with one or more intermediate components. Such components can still comprise basic hardware and software. It will be observed, still for those who work in the field, that different achievement configurations can be presented which, even if not explicitly described or shown, attain the principles that are referenced in the scope of this description.

In the same manner, when there is mention of processor or controller, reference is not only made to hardware elements which execute software, but implicitly it comprises, without any limitation, a series of complementary structures such as particular digital signal processors, service servers, proxy servers and network servers.

The invention claimed is:

1. Telecommunications network architecture comprising the hardware (3) and software (4) resources for the connection of N users to the Internet in order to operate in a Social Network, with different user types, comprising:
I. a plurality of Individual Avatars (12), or entities each formed by a single person, with his own stored profile of interests;
II. a plurality of Join Avatars (12), or entities formed by one or more Individual Avatars, whose profile is variable as a function of the Event that is created, its main function being that of arranging the interworking of Individual Avatars with different entities for the common attainment of a simultaneous event;
III. at least one Event Avatar as a platform in which the exchange of information occurs, in order to attain the common object between the Individual Avatars that form the different Join Avatars;
IV. at least one data analysis platform ( ) based on models of predictive probabilistic type in order to operate in an adaptive manner;
also characterized in that it comprises:
i. a plurality of terminals ($2'$, $2''$, $2^N$), each possessed by a single user, capable opening a session with a central server (10) dedicated to the Social Network, each user being associated with at least one Individual Avatar with a series of attributes and distinctive data relative to an event in the course of adhesion;
ii. a first database (8) of static type resident on the central server (10) set for registering the user in the Social Network and for creating a public or semi-public profile inside the bound system constituted by the Social Network itself, for the sole purpose of managing the contact lists,
iii. a second database (12), resident on the central server (10) with data structuring mechanism, operative in real time, in relation to the sequence of events proposed to the instance users of the first database (8), on which it operates in order to provide a Join Avatar functionality constituted by the communication between a plurality of said Individual Avatars which cooperate for the attainment of virtual meetings in relation to contingent events;
iv. a third database (14) resident on the central server (10) associated with a predictive maintenance Avatar, as an engine with commercial character, comprising statistical processing and forecast functions and capable of promoting events on which interest is to be attracted and adhesion induced, each Individual Avatar in possession of user terminal ($2'$, $2''$, $2^N$), each user with his own Individual Avatar assuming on the portal-server (10) of the Social Network, to which it is connected by means of its terminal (2), a user profile susceptible to being changed in relation to the given event for each session, the configuration of said profile being frequently and regularly varied starting from the fundamental attributes such as marital status, interests, education qualification, work, . . . , in a manner such that based on the succession of events and relative adhesions, the Join Avatars, one for each event, exchange information with each other regarding the determination by the users to follow one organized event or initiative rather than another, an instance of the database (12) of the different Join Avatar being configured each time based on the different Individual Avatar profiles that have come to be configured for each event.

2. Telecommunications network architecture for constituting a Social Network between users according to claim 1, characterized in that the configuration of the Individual Avatars starting from the instance of the primary database (8) is based on a scheme which in its data structure comprises data and information strictly dependent on the type of event with which it is desired to interact, the Individual Avatars possessing a series of characterizing data or attributes, susceptible to variation, and being able to show specific behaviors or functions since they are able to execute and select a series of possible options from among those pre-established in relation to the event.

3. Procedure for achieving advanced dynamic functionalities in the context of the Social Networks which employs the network architecture according to claim 1, characterized in that each user with his own Individual Avatar assumes, on the portal-server (10) of the Social Network to which he is connected by means of his terminal (2), a user profile susceptible to changes in relation to the given event for each session, the configuration of said profile being frequently and regularly varied starting from the fundamental attributes such as marital status, interests, education qualification, work, . . . , in a manner such that on the basis of the succession of events and relative adhesions, the Join Avatars, one for each event, exchange information with each other regarding the determination by the users to follow one organized event or initiative, rather than another, each time configuring an instance of the database (12) of the Join Avatar that is different based on the different Individual Avatar profiles that have come to configure for each event.

4. Procedure for achieving advanced dynamic functionalities in the context of the Social Networks according to claim 1, characterized in that it defines a series of participation areas for each user belonging to a plurality of Social Networks, so as to be able to dynamically manage the contact with the user himself in the scope of the proposed events by providing for a step of creating the Individual Avatar, such as starting from the personal profile initially acquired on the basis of specific personal information, comprised in the scope of the primary data bank (8), the user identifications being shared and assigned to predetermined lists of personal participation areas, determining the relative cataloguing of each user in the scope of the different configured sectors of interest, possibly with the same user catalogued in multiple sectors of interest.

5. Procedure for achieving advanced dynamic functionalities in the context of the Social Networks according to claim 1 claims, characterized in that following the frequent, uninterrupted and sequential registrations of users, the relative frequency is evaluated in real time of all the participation areas that are significant for a user community, for the purpose of obtaining a series of weighted areas with reference to the relative sectors of interest.

6. Procedure for achieving advanced dynamic functionalities in the context of the Social Networks according to claim 1, characterized in that one or more events are proposed to the community of users with their own Individual Avatars, on the basis of a statistical evaluation of the frequencies in a certain interest area, and from here the adhesion tables resident at the database (12) of the Join Avatars are manipulated by monitoring protocols, in real time and processed on the server (10) in a manner so as to allow the different Join Avatars to exchange all the information with each other regarding the determination by the users to follow one organized event or initiative—rather than another—and therefore in a manner so as to build and update the adhesion tables in an automatic manner.

7. Procedure for achieving advanced dynamic functionalities in the context of the Social Networks according to claim 1, characterized in that the increase or the lack of adhesions, and hence respectively an excess or an insufficient number of participants at an event, produces variations in the database (12) arranged in the adaptive statistical process which makes the event achievable with predetermined operative modes or otherwise over possible alternative paths, on the basis of the interest of the groups of each sector evaluating the feasibility of actions of diverting/directing the users to reserve or in any case alternative events.

8. Procedure for achieving advanced dynamic functionalities in the context of the Social Networks according to claim 1, characterized in that the dynamic managing of the Avatar provides that the tables of the database (12) of the Join Avatars are continuously updated and modified based on changes in the determination to follow an organized event or initiative, even if the tables themselves originally depend on the information collected by means of the procedures that detect the information on the profiles and the interests which characterize each user, new definitions of Individual Avatars and Join Avatars being derived, in relation to an event, starting from the preceding profiles with the reuse of functionalities and behaviors of the specific Avatars in the context of similar events.

9. Procedure for achieving advanced dynamic functionalities in the context of the Social Networks according to claim 1, characterized in that the Join Avatars, through the relative databases (8, 12), exchange data packets with different size, structure and information according to the type of event that is being set up and that they are sensitive to the detection of participant increases, or to decreases of the participants themselves, and hence to a trend that is indicating an insufficiency or a sufficiency of participation, in order to ensure that the database (14) of the predictive maintenance Avatar can reconfigure the event and the relative dynamic table or select alternative solutions which interest the users and do not divert/direct them to external events.

10. Procedure for achieving advanced dynamic functionalities in the context of the Social Networks according to claim 1, characterized in that the database (12) of the Join Avatars and the database (14) of the predictive maintenance Avatar effectively and dynamically manage the progression of the interest for a certain event, by being based on a series of evaluations of probabilistic statistical type pertaining to the average quadratic deviation or standard deviation, the average deviance and the variance, both preliminary and from real time monitoring, in relation to the progression of the event.

11. Procedure for achieving advanced dynamic functionalities in the context of the Social Networks according to claim 1, characterized in that the management of a specific event and the relative Join Avatar by means of the data regarding the event that defines its identity and after the acquisition of at least one Individual Avatar, provides for populating the Join Avatar itself through the ex-novo iterative creation of new Individual Avatars starting from the adhesions of Individual Avatar Friends, by means of a reproduction of a registration of the pre-established set of basic information and the relative activation through the steps of:
  a. presenting the relative activation notice to the Individual Avatar himself, who proceeds to load the Individual Avatar Friend that he wishes to involve;
  b. for the Individual Avatar Friend involved in a Join Avatar in event participation, starting an Invited procedure which communicates to such Friend the possibility of acquiring all the details regarding the specific event;
  c. waiting state by the Individual Avatar Friend in the organization of the Join Event, until the enabling has been established with the reception of the Chat Avatar during such waiting period; the data loaded by the user can in any case be managed and changed during the creation of his Individual Avatar;
  d. after the reception of the Chat Avatar, enabling the operative condition that allows the Individual Avatar Friend involved in a Join Avatar to organize the events himself.

12. Procedure for achieving advanced dynamic functionalities in the context of the Social Networks according to claim 1 claims, characterized in that the Chat Avatar with which the generated virtual event starts its process of transformation towards the real event, through the exchange of information that is generated between the involved entities, bases the meeting between the different entities of Avatar type, structured according to a priority scheme by means of a series of executive steps, in which:
  i. preliminary, all the Avatar entities involved in the event have in common the same Chat Avatar loaded with the entire chronology of the messages since its creation, by activating the function of registration with relative chronology of the exchanged messages; and ii. upon activation of one's Chat Avatar, the Join Avatar of a user is placed first, with greater priority, and then the Join Avatar Guest is placed, the user only being subordinate to the predictive maintenance Avatar in the relative exchange of messages;

the procedure for sending and receiving messages providing for:

A) the sending of the message to an Individual Avatar Guest by activating the Join function of the Join Avatar Guest in a manner so as to display all the Individual Avatar Guests involved in the Join Event, and then by activating the chat function of the specific Individual Avatar Guest to whom it is wished to send to message, B) the reception of a message from an Individual Avatar Guest, on the basis of which, at the user who receives the message, there appears the writing line of the Chat Avatar composed of a series of structured data and information, the Chat Avatar being able to be deactivated by the predictive maintenance Avatar when its relative execution is recognized to be impossible, or at the conclusion of the event, given that it can be individually eliminated by the entity involved in the event, which can in any case save a proprietary copy of the information relative to the event comprised in the Chat Avatar.

13. Procedure for achieving advanced dynamic functionalities in the context of the Social Networks which employs the network architecture according to claim 2, characterized in that each user with his own Individual Avatar assumes, on the portal-server (10) of the Social Network to which he is connected by means of his terminal (2), a user profile susceptible to changes in relation to the given event for each session, the configuration of said profile being frequently and regularly varied starting from the fundamental attributes such as marital status, interests, education qualification, work, . . . , in a manner such that on the basis of the succession of events and relative adhesions, the Join Avatars, one for each event, exchange information with each other regarding the determination by the users to follow one organized event or initiative, rather than another, each time configuring an instance of the database (12) of the Join Avatar that is different based on the different Individual Avatar profiles that have come to configure for each event.

* * * * *